(12) United States Patent
Shimoda et al.

(10) Patent No.: US 6,774,884 B2
(45) Date of Patent: Aug. 10, 2004

(54) ELECTROPHORETIC DEVICE, ELECTRONIC SHEET INCLUDING THE SAME, ELECTRONIC BOOK INCLUDING THE ELECTRONIC SHEET, AND MANUFACTURING METHOD THEREOF

(75) Inventors: Tatsuya Shimoda, Suwa (JP); Hideyuki Kawai, Suwa (JP); Satoshi Inoue, Suwa (JP)

(73) Assignee: Seiko Epson Corporation (JP)

( * ) Notice: Subject to any disclaimer, the term of this patent is extended or adjusted under 35 U.S.C. 154(b) by 149 days.

(21) Appl. No.: 09/999,160

(22) Filed: Nov. 30, 2001

(65) Prior Publication Data

US 2002/0105600 A1 Aug. 8, 2002

(30) Foreign Application Priority Data

Dec. 1, 2000 (JP) ........................................ 2000-367165

(51) Int. Cl.⁷ ................................................ G09G 3/34
(52) U.S. Cl. ........................................ 345/107; 359/296
(58) Field of Search ................................ 345/107, 105, 345/106, 204, 205, 206, 901, 903, 92, 87, 88, 89, 91; 359/296; 430/38; 349/38, 39, 42

(56) References Cited

U.S. PATENT DOCUMENTS

| | | | |
|---|---|---|---|
| 5,956,005 A * | 9/1999 | Sheridon ........................ 345/84 |
| 6,192,890 B1 * | 2/2001 | Levy et al. ..................... 128/899 |
| 6,266,037 B1 * | 7/2001 | Flasck ............................. 345/92 |
| 6,312,304 B1 * | 11/2001 | Duthaler et al. ............... 445/24 |
| 6,375,461 B1 * | 4/2002 | Jensen et al. ................. 433/136 |
| 6,473,072 B1 * | 10/2002 | Comiskey et al. ........... 345/173 |
| 6,518,949 B2 * | 2/2003 | Drzaic ........................... 345/107 |
| 2002/0033792 A1 * | 3/2002 | Inoue ............................ 345/107 |
| 2002/0123176 A1 * | 9/2002 | Izumi et al. .................. 438/149 |
| 2002/0141801 A1 * | 10/2002 | Shimoda et al. ............... 400/76 |

* cited by examiner

Primary Examiner—Xiao Wu
(74) Attorney, Agent, or Firm—Harness, Dickey & Pierce, P.L.C.

(57) ABSTRACT

An electrophoretic device including a display region including a plurality of pixels, each having an electrophoretic dispersion layer, a capacitive element for storing charge for maintaining the electrical polarization of the electrophoresis dispersion, and an organic transistor for causing the capacitive element to store charge when turned on, wherein the electrophoretic dispersion layer has a electrophoresis dispersion. A driver region for optionally choosing pixels in the display region to turn on the transistors of the pixels is provided around the display region of the electrophoretic device. An electronic sheet is achieved by transmitting external signals to the driver region to freely change display contents on the display region.

16 Claims, 8 Drawing Sheets

(a)

(b)

(c)

(a)

(b)

ELECTROPHORETIC DEVICE, ELECTRONIC SHEET INCLUDING THE SAME, ELECTRONIC BOOK INCLUDING THE ELECTRONIC SHEET, AND MANUFACTURING METHOD THEREOF

TECHNICAL FIELD

The present invention relates to an electrophoretic device, an electronic sheet including the same, an electronic book including the electronic sheet, and a manufacturing method thereof. The present invention particularly relates to an electrophoretic device for displaying desired information, an electronic sheet including the same, an electronic book including the electronic sheet, and a manufacturing method thereof.

BACKGROUND ART

In general, when information output from personal computers is displayed, displays such as CRTs (Cathode Ray Tube) or liquid crystal displays are used. Information displayed on the displays is printed with a printer in some cases. When mobile computers are used out of the office, printing is not possible. When printers are not at a place where one is visiting, there is no means for printing and that is inconvenient.

A so-called electronic book having a liquid crystal display is disclosed in Japanese Unexamined Patent Application Publication No. 5-265961. Although displayed contents on the displays are rewritable, carrying is not easy because of the thickness and the weight. In order to use electronic sheets such as recording media and electronic books which are electrically writable, that is, electronic devices which include the recording media and in which specific information is recorded, maintaining a display of contents and records for a long time is necessary and the excellent flexibility is also important.

SUMMARY OF THE INVENTION

The present invention has been developed to solve the above problems of known technology, and it is an object to provide an electrophoretic device which is easy to carry and is capable of being printed out of the office, an electronic sheet having the same, an electronic book including the electronic sheet, and a manufacturing method thereof.

The electrophoretic device of the present invention includes a display region including a plurality of pixels having an electrophoretic dispersion layer, a capacitive element for maintaining the electrical polarization of the electrophoretic dispersion layer, and an organic transistor storing charge in the capacitive element, wherein the electrophoretic dispersion layer includes an electrophoretic dispersion.

PREFERRED EMBODIMENTS OF THE INVENTION

Figure 1:
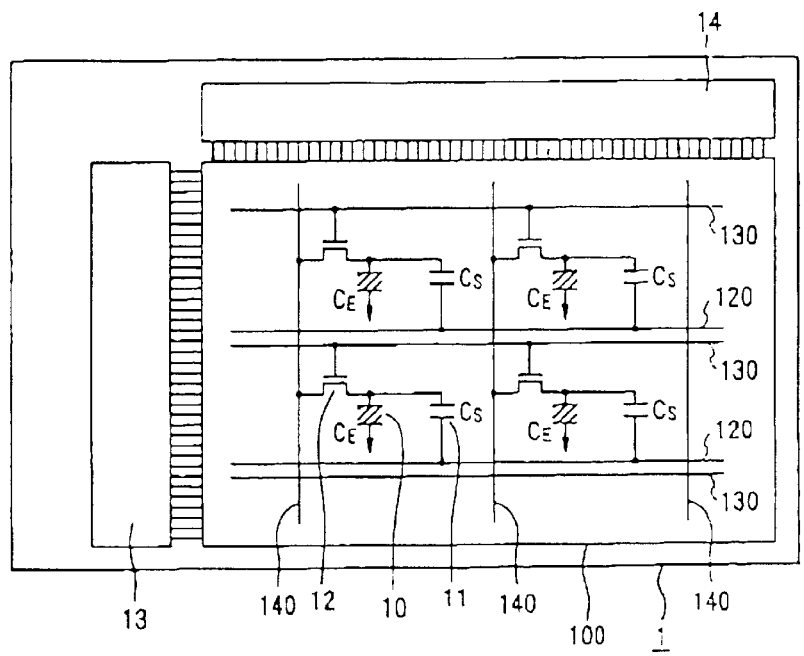
FIG. 1 is a plan view showing a planar structure of an electronic sheet according to an embodiment of the present invention.

An electrophoretic device according to the present invention, includes a display region including a plurality of pixels, each having an electrophoretic dispersion layer, a capacitive element for maintaining the electrical polarization of the electrophoretic dispersion layer and an organic transistor for causing the capacitive element to store charge, wherein the electrophoretic dispersion layer includes an electrophoretic dispersion. Printing out of the office is possible and carrying is easy due to such a configuration.

In a preferred embodiment according to the present invention, an electronic sheet including the above electrophoretic device is provided, wherein the electrophoretic device is formed on a flexible substrate. The flexible electronic sheet is achieved by forming the display region including a electrophoretic dispersion on the flexible substrate. The organic transistor is defined as one having an active layer which is composed of an organic material.

In a preferred embodiment according to the present invention, the electronic sheet further including a driver region for controlling the operation of the organic transistors is provided. Since the driver region is provided to the electronic sheet, it is not necessary to provide an external driver circuit.

In a preferred embodiment according to the present invention, the electronic sheet in which the electrophoretic dispersion layer is formed by arranging a plurality of capsules filled with the electrophoretic dispersion is provided. Since the capsules filled with the electrophoretic dispersion are used, application of the dispersion is easy.

In a preferred embodiment according to the present invention, the electronic sheet in which the driver region is formed by stripping a thin-film formed on a substrate and then pasting the thin-film onto a surface of another flexible substrate is provided. Since the driver region is formed by the above method, the driver region may be easily disposed around the display region.

In a preferred embodiment according to the present invention, the electronic sheet further including a contactless terminal for inputting external signals transmitted to the driver region is provided, wherein the external signals are applied through the contactless terminal. Since contactless terminals are used, reliability and durability of the electronic sheet are improved due to the non-use of exposed terminals.

In a preferred embodiment according to the present invention, the electronic sheet in which the contactless terminal includes an loop coil and a through hole extending through the center of the loop coil is provided, wherein the external signals are input by magnetism applied over the through hole. In such a configuration, the electronic sheet is joined in a binder and receives signals concerning display contents in a contactless manner.

In a preferred embodiment according to the present invention, the electronic book including a rod magnet extending through the through hole provided in the above electronic sheet and a controlling coil wound around the rod magnet is provided, wherein the external signals are input to the electronic sheet by applying magnetism generated by the controlling coil. In such a configuration, signals concerning display contents are transmitted to the electronic sheet joined in a binder in a contactless manner.

In a preferred embodiment according to the present invention, the electronic book in which the rod magnet freely opens and closes at a dividable intermediate portion thereof and the magnetic loop is closed when the rod magnet is closed to join the electronic sheet in a state where the rod magnet extends through the through hole is provided. Since the closed loop is formed, signals are accurately transmitted to the electronic sheet in a binder in a contactless manner.

In a preferred embodiment according to the present invention, the electronic book in which transmitting and receiving the external signals are performed between the controlling coil and the loop coil by magnetism is provided. Since transmitting and receiving signals between the coils are performed, signals are accurately transmitted to the electronic sheet in a binder in a contactless manner.

In a preferred embodiment according to the present invention, a method for manufacturing the above electronic sheet includes the steps of forming a transistor array including the organic transistors on the flexible substrate, forming a partition in the shape of a frame outside the resulting transistor array, and forming an electrophoretic dispersion layer inside the frame. The electronic sheet is easily manufactured by such a method.

In a preferred embodiment according to the present invention, in the method for manufacturing the electronic sheet, the electrophoretic dispersion layer is formed by arranging a plurality of capsules filled with the electrophoretic dispersion. Since the electrophoretic dispersion is encapsulated in the capsules, application of the dispersion is easy.

In a preferred embodiment according to the present invention, the method for manufacturing the electronic sheet further includes the steps of forming the driver region as a thin-film on another substrate, pasting the stripped driver region onto a region other than the organic transistor region; electrically connecting the organic transistor region and the driver region, and forming a partition in the shape of a frame. Since the driver region is formed by the above method, the driver region is easily disposed around a display region.

In a preferred embodiment according to the present invention, a method for manufacturing the electronic sheet includes the step of forming the organic transistor by at least an ink jet process. Since the organic transistors are formed by the ink jet process, the electronic sheet is manufactured without special equipment such as a vacuum chamber.

With reference to the drawings, embodiments of the present invention will now be described in detail. In the drawings referred to in the following description, the same components or parts as those of other drawings are represented by the same reference numerals.

FIG. 1 shows an electronic sheet according to an embodiment of the present invention. As shown in the figure, the electronic sheet 1 of the embodiment includes a display region 100, a scan driver region 13, and a data drive region 14, wherein the display region 100 includes an electrophoretic dispersion and an organic TFT (thin film transistor) formed by arranging organic transistors, and the scan driver region 13 having the TFT and the data driver region 14 having the TFT are provided around the display region 100. The scan driver region 13 transmits a scan signal for choosing the pixels of the display region 100. The data driver region 14 transmits a data signal corresponding to data displayed by using the pixels of the display region 100. When a driver circuit having the same functions as those of the scan driver region 13 and the data driver region 14 is provided outside the electronic sheet 1, an electrophoretic device without the scan driver region 13 and the data driver region 14 is achieved. As shown in FIG. 1, when a driver region is provided in the electronic sheet 1, an external driver circuit is not necessary.

The display region 100 includes a plurality of pixels for creating a desired display. Each pixel includes an electrophoretic dispersion 10, a capacitive element 11 for maintaining the electric polarization of the electrophoretic dispersion 10, and an organic transistor 12 for switching to cause the capacitive element 11 to store charge.

Referring to FIG. 1, the display region 100 also includes a scan line 130 for transmitting a scan signal to the gate of each organic transistor 12 from the scan driver region 13, a data line 140 for transmitting a data signal to the source of each organic transistor 12 from the data driver region 14, and a ground line 120 for providing a ground potential to one electrode of the capacitive element 11. The capacitive element 11 has a capacitor $C_s$. Also, the electrophoretic dispersion 10 having a capacitor $C_e$ is shown in FIG. 1.

Figure 2:
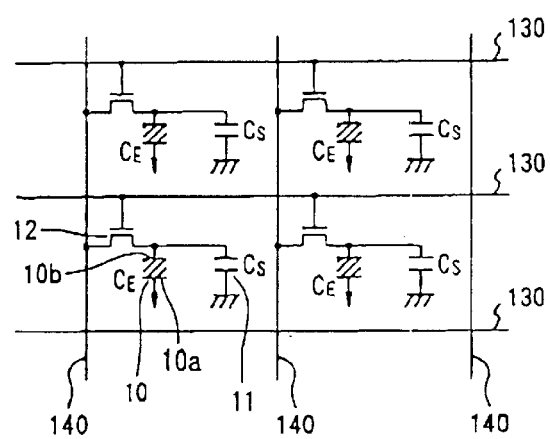
FIG. 2 is an illustration showing a configuration of a display region shown in FIG. 1.

The equivalent circuit of the display region 100 is shown in FIG. 2. Referring to the figure, the ground line 120 shown in FIG. 1 provides a ground potential to one of the electrodes of the capacitive element 11. The other electrode of the capacitive element 11 is connected to the drain of the transistor 12 and one electrode 10b of the capacitor $C_e$ included in the electrophoretic dispersion 10. The other electrode 10a of the capacitor $C_e$ included in the electrophoretic dispersion 10 is applied with a voltage of a predetermined level. As described below, changing the direction of the voltage applied to the electrophoretic dispersion 10 realizes two kinds of polarization in the electrophoretic dispersion 10 to create a desired display.

The organic transistors may be manufactured by a liquid phase process or preferably by an ink jet process in some cases.

In such a configuration, a transistor of the organic transistors 12 in the display region 100, of which the gate receives a scan signal through the scan line 130, is turned on. Charge is stored in the capacitive element 11 through the transistor, which is turned on, in response to a data signal received through the data line 140. At this time, the electrophoretic dispersion 10 is electrically polarized. Even if the transistor is then turned off, the polarization of the electrophoretic dispersion 10 is maintained by the charge stored in the capacitive element 11. In this instance, the polarization is maintained in a state where specific color components gather at the side of either an electrode 10a or an electrode 10b in response to the signal level of the data signal. Thus, data corresponding to the contents of the received data signal is displayed on the display region 100.

The driver region 13 outputting the scan signal and the driver region 14 outputting the data signal require external electricity and data. The electricity and the like may be supplied to the scan driver region 13 and the data driver region 14 transmitting signals to the display region 100 through external terminals which are electrically connected as shown in FIG. 3, or the electricity and the like may be supplied without contact through contactless external terminals as shown in FIG. 4.

Figure 3:
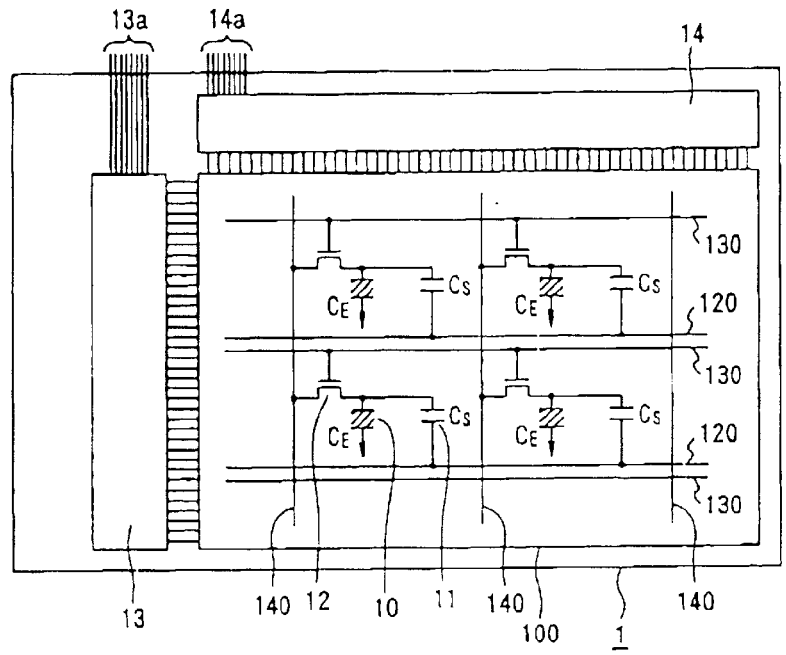
FIG. 3 is an illustration showing an exemplary configuration for supplying electricity and transmitting data to an electronic sheet.

In the configuration shown in FIG. 3, one ends of external signal lines 13a and 14a are connected to the scan driver region 13 and the data driver region 14, other ends thereof are connected to external terminals (not shown) provided on the surface of the electronic sheet, and electricity and the like may be supplied through an external circuit electrically connected to the external terminals.

Figure 4:
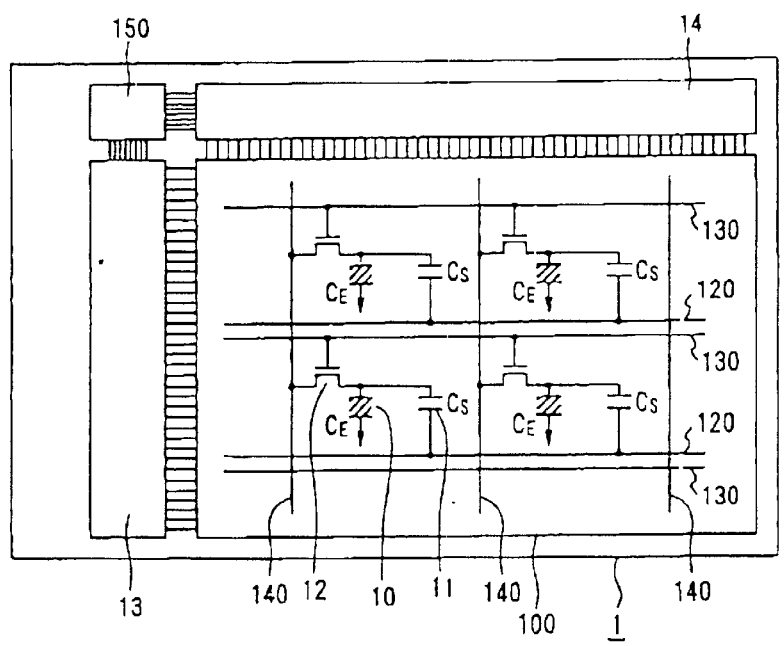
FIG. 4 is an illustration showing another exemplary configuration for supplying electricity and transmitting data to an electronic sheet.

In the configuration shown in FIG. 4, an integrated circuit 150 including contactless terminals and the like is provided on the surface of the electronic sheet, and electricity and the like may be externally supplied to the integrated circuit 150 in a contactless manner. For example, a method of data communication and electrical supply in a contactless IC card system disclosed in Japanese Unexamined Patent Application Publication No. 2000-242739 may be applicable.

Figure 5:
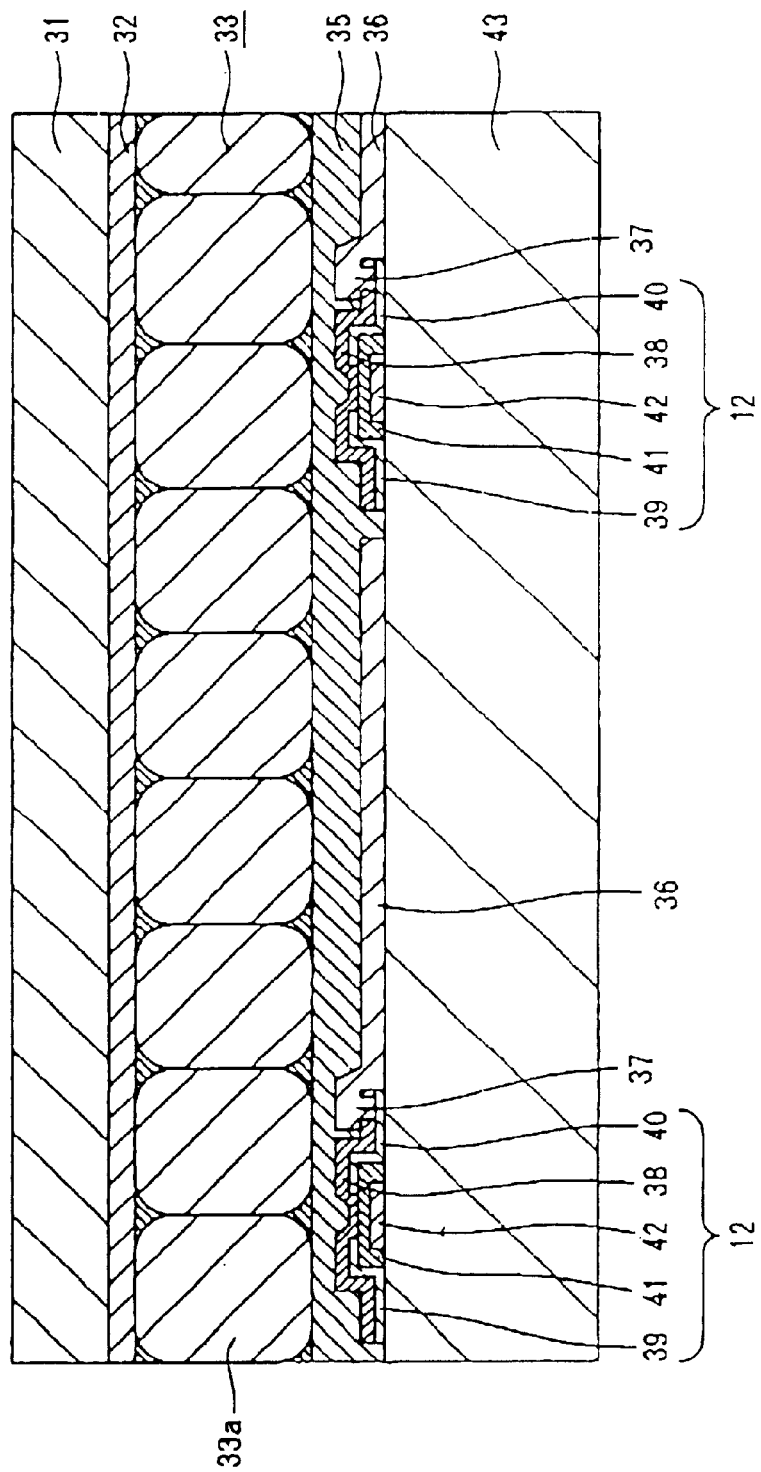
FIG. 5 is a sectional view showing a sectional structure of the display region of an electronic sheet according to an embodiment of the present invention.

FIG. 5 shows the sectional structure of one pixel of the display region 100. The display region of the electronic sheet includes a substrate 43, the organic transistor 12 formed on the substrate 43, an electrode 36 composed of ITO (indium tin oxide), a via hole 37 connecting the organic transistor 12 with the electrode 36, a resin layer 35 formed thereon, an electrophoretic dispersion layer 33, an ITO electrode 32 formed thereon, and a PET film 31. When the resin layer 35 is composed of a proper material, the resin layer 35 functions as a capacitive element. When the resin layer 35 does not function as a capacitive element, a capacitive element may be provided at a position to be electrically connected in parallel or in series to the electrophoretic dispersion layer 33.

Many microcapsules 33a filled with the electrophoretic dispersion are arranged in the electrophoretic dispersion layer 33. Since the electrophoretic dispersion is encapsulated in capsules, application of the dispersion is easy. The microcapsule 33a is preferably filled with a liquid disperse medium and electrophoretic particles dispersed in the liquid disperse medium. The liquid disperse medium and the electrophoretic particles preferably have different colors from each other.

Figure 6:
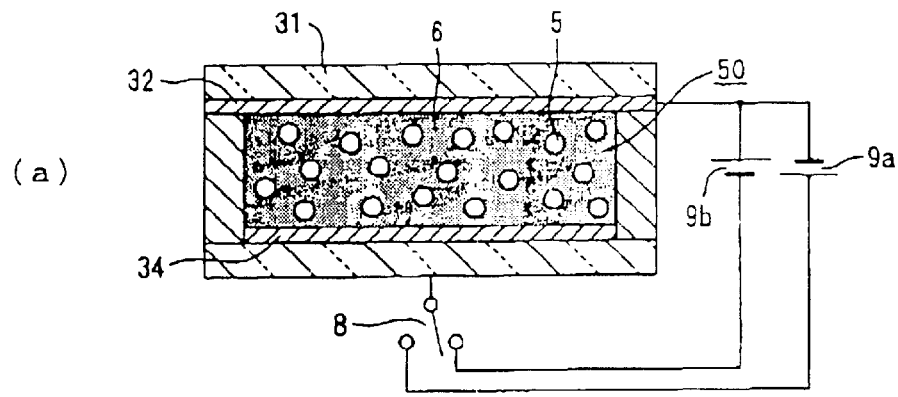
FIG. 6 includes illustrations showing the principles of display of an electronic sheet.
Figure 6:
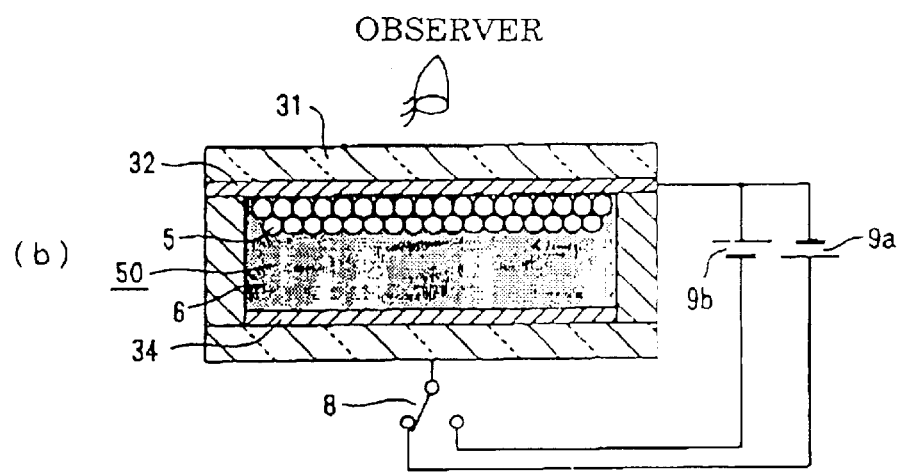
Figure 6:
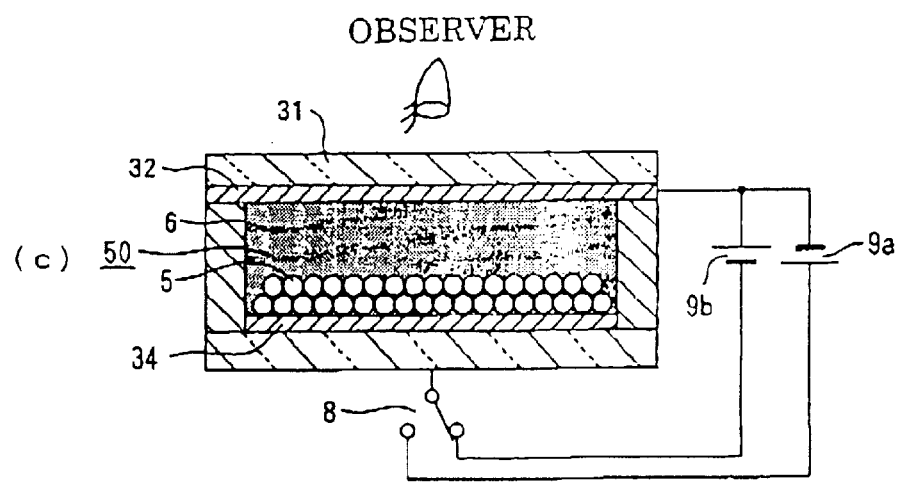

The electrophoretic dispersion in the microcapsule 33a is electrically polarized in two states in response to the direction of the applied voltage. That will now be described with reference to FIG. 6. FIG. 6 schematically shows the electrical polarization in a microcapsule. FIG. 6(a) shows that an electrophoretic dispersion 50 in the microcapsule 33a is placed between an electrode 34 and a transparent electrode 32. The electrophoretic dispersion 50 is composed of the liquid disperse medium 6 and the electrophoretic particles 5. The liquid disperse medium 6 and the electrophoretic particles 5 have different colors from each other.

Power sources 9a and 9b for applying voltage in the opposite direction to each other are connected through a switch 8. That is, the electrode 32 is connected to one end of each of the power sources 9a and 9b, and the electrode 34 is connected to the other end of each of the power sources 9a and 9b through the switch 8. In such a connection, the direction of an applied voltage is changed with the switch 8. Changing the direction of the applied voltage polarizes the electrophoretic dispersion, thereby creating a desired display. As shown in FIG. 6(b), when applying a voltage from the power source 9a, the electrophoretic particles 5 gather at the transparent electrode 32 side close to the observer. In this state, the observer sees the color of the electrophoretic particles 5. On the other hand, as shown in FIG. 6(c), when applying a voltage from the power source 9b, the electrophoretic particles 5 gather at the electrode 34 side far from the observer. In this state, the observer sees the color of the liquid disperse medium 6.

As described above, two kinds of colors are displayed in response to the direction of an applied voltage by electrically polarizing the electrophoretic dispersion 50 in the microcapsule; hence, the electronic sheet using electrophoretic display technology is achieved by providing the configuration shown in FIG. 6(c) to all pixels.

Referring to FIG. 5, the organic transistor 12 includes a gate 42, an insulating layer 41, a source 39, a drain 40, and a semiconductor layer 38.

The sectional structure of the organic transistor will now be described with reference to FIG. 7.

Figure 7:
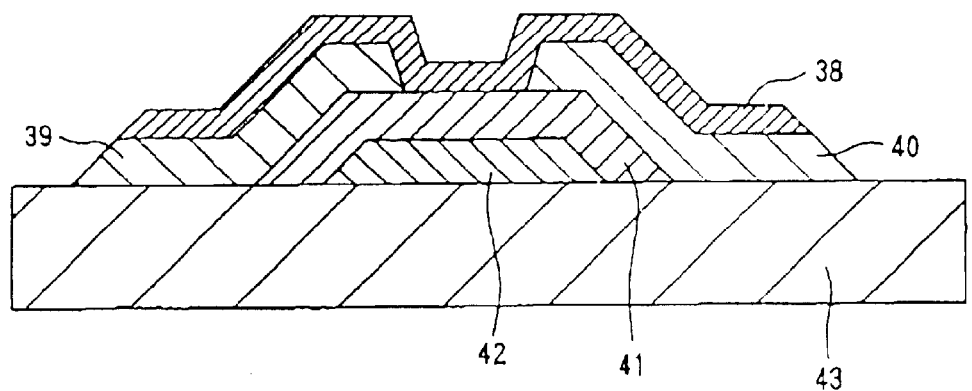
FIG. 7 is a sectional view showing an exemplary sectional structure of an organic transistor.

As shown in FIG. 7, the organic transistor includes the gate 42 formed on the substrate 43, the gate insulating layer 41 formed on the gate 42, the source 39 and the drain 40 formed on the gate insulating layer 41 and the substrate 43, and the semiconductor layer 38 for providing a channel region.

In this configuration, the substrate 43 is composed of, for example, PET (polyethylene terephthalate) or borosilicate glass for a liquid crystal display (for example, glass No. 7059 manufactured by Corning Inc.). When a glass substrate is used, it is soaked in a solution, for example, hexadecane containing 2% of organic silane (OST: octadecyltrichlorosilane) and then is dried. When a PET substrate is used, it is exposed to an OST vapor, for example, in an vacuum.

The semiconductor layer 38 is prepared under the following conditions: for example, a vacuum thermal deposition of pentacene, a substrate temperature of 60° C., and a deposition rate of 0.5 Å/s. The pentacene is purified in advance by thermal gradient vacuum sublimation. High mobility is achieved by a low substrate temperature, low deposition rate, and high purity.

The semiconductor layer 38 is composed of, for example, pentacene. The gate 42 is composed of, for example, nickel by ion beam sputtering. Photolithography may be used for the preparation.

The gate insulating layer 41 is composed of, for example, silicon oxide ($SiO_2$) and prepared at a substrate temperature of 80° C. to reduce stress. Photolithography may be used for the preparation. The source 39 and the drain 40 are composed of, for example, palladium by ion beam sputtering. Photolithography may be used for the preparation. The gate insulating layer 41 is surface-treated to increase mobility.

The transistor prepared by the above procedure has the following characteristics: gate width/gate length=240/44 $\mu M$, field effect mobility $\mu$ eff=1.1 $cm^2/Vs$, and Vth=2 V in the case of using a PET substrate; and gate width/gate length=500/5 $\mu m$, field effect mobility $\mu$ eff=1.7 $cm^2/Vs$, Vth=10 V, an S value of 0.9 V/decade, an On/Off ratio of $10^3$, and a current of 2.5 $\mu A$/micron gate width in case of using a glass substrate.

The organic transistor is described in Gundlach, David J. et al., "High-Mobility, Low Voltage Organic Thin Film Transistors", IEDM99-111, 1999, IEEE.

Figure 8:
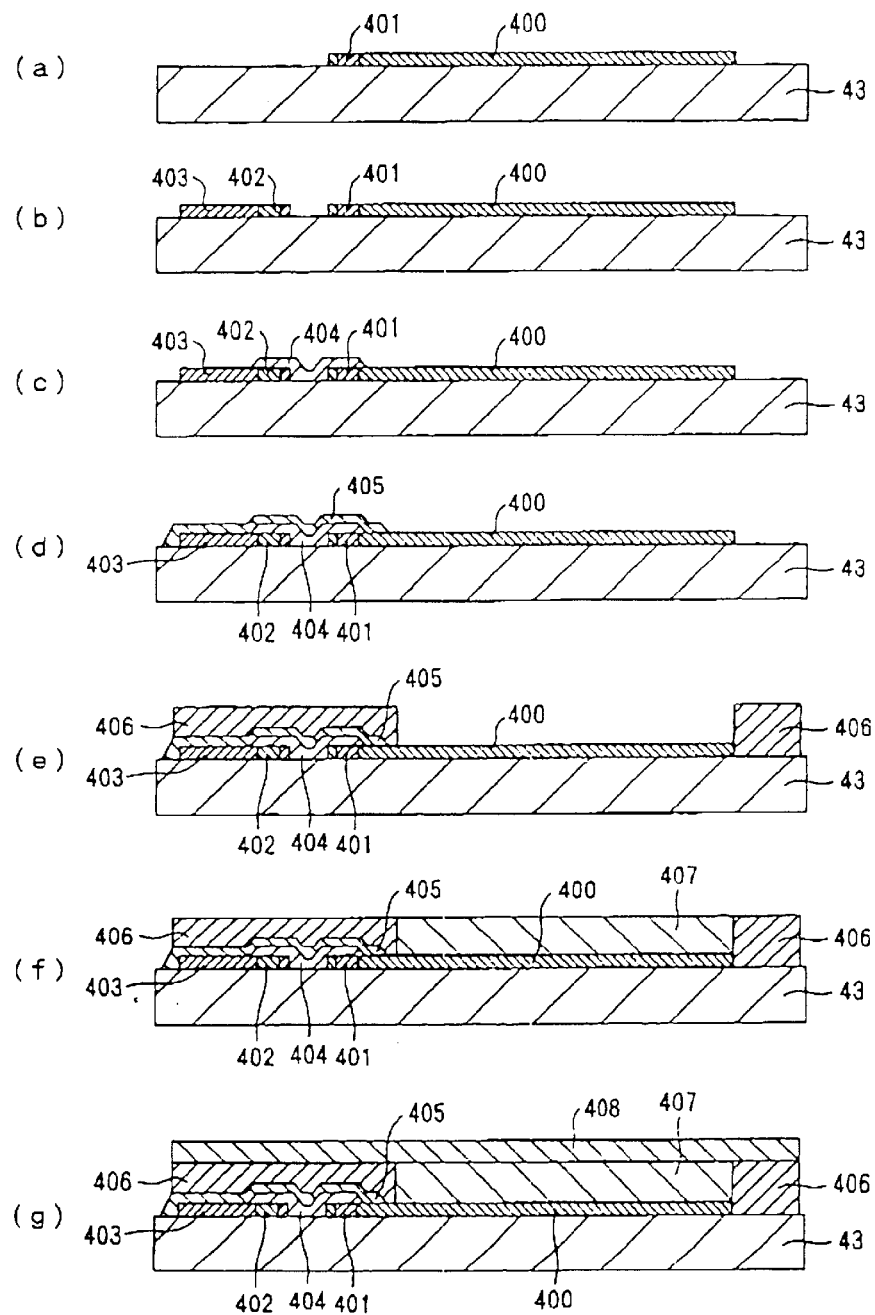
FIG. 8 includes illustrations, each having a sectional view showing a manufacturing process of an electronic sheet and the steps thereof.

Referring to FIGS. 8A to 8G, a process for manufacturing the electronic sheet having the display region described above will now be described. As shown in FIG. 8(a), an organic TFT array 400 composed of the organic transistors described above is first formed on a substrate 43. In the figure, the organic TFT array 400 includes an electrode 401. As shown in FIG. 8(b), an SUFTLA-TFT 403 is transferred to form the same layer as the organic TFT array 400. As shown in FIG. 8(c), the electrode 401 of the organic TFT array 400 and the electrode 402 of the SUFTLA-TFT 403 are connected with a wiring 404. The wiring 404 is formed by an ink jet process or photolithography.

"SUFTLA" is defined as a technique that a thin-film formed on a substrate is stripped by laser irradiation or the like and then is pasted onto another substrate. The driver region can be easily disposed around the display region by this technique. "SUFTLA-TFT" is defined as a thin-film transistor prepared by "SUFTLA". "SUFTLA" is described in Utsunomiya, S. "Low Temperature Poly-Si TFTs on Plastic Substrate Using Surface Free Technology by Laser Ablation/Annealing" SID 00 DIGEST. "SUFTLA" is a trademark.

As shown in FIG. 8(d), a passivation layer 405 is formed. The passivation layer 405 is composed of silicon oxide ($SiO_2$) or an organic insulator such as polyimides. Then, as shown in FIG. 8(e), a resin layer 406 is applied onto the frame to form a partition. As shown in FIG. 8(f), an electrophoretic dispersion 407 is used inside the frame composed of the resin layer 406. Finally, as shown in FIG. 8(g), an ITO sheet 408 is laminated.

By the above manufacturing process, the electronic sheet having the planar structure shown in FIG. 1 is provided. Since the organic transistor is used in the above manufacturing process, the electronic sheet can be manufactured by an ink jet process or the like without using special equipment such as a vacuum chamber. Since special equipment such as a vacuum chamber is not used, the manufacturing cost is reduced and a low-cost electronic sheet can be manufactured.

The electronic sheet as described above preferably has a thickness of about 0.1 to 0.2 mm and the electrophoretic dispersion layer has a thickness of about 30 to 50 $\mu$m.

Thus, the electronic sheet may be handled as sheet and printed contents (displayed contents) thereof may be rewritten many times without a printer. In mobile computers, when the external terminals described above or terminals for supplying electricity and the like to the integral circuit 150 is connected to the electronic sheet, contents displayed in the electronic sheet may be freely rewritten.

Although general displays must be rewritten 60 times per second, the electronic sheet may be rewritten with a very low frequency (for example, once per minute); hence, the electronic sheet is beneficial since the time for rewriting is short. Since the contents may be rewritten many times, the electronic sheet of the present invention may be used instead of sheet; hence, recycling is stimulated.

The displayed contents (that is, the polarization of the electrophoretic dispersion) of the electronic sheet are maintained by charge stored in the capacitive element provided to each pixel, as described above. The capacitive element may be disposed to be electrically connected in parallel or in series to the electrophoretic dispersion layer. The capacitive element may be composed of a dielectric material and such a configuration may be effective in maintaining the polarization of the electrophoretic dispersion for a long time in some cases.

Figure 9:
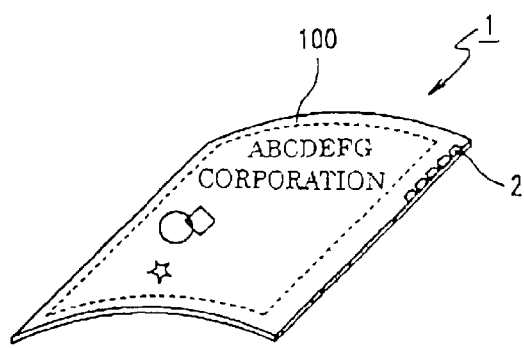
FIG. 9 includes illustrations showing an exemplary use of an electronic sheet.
Figure 9:
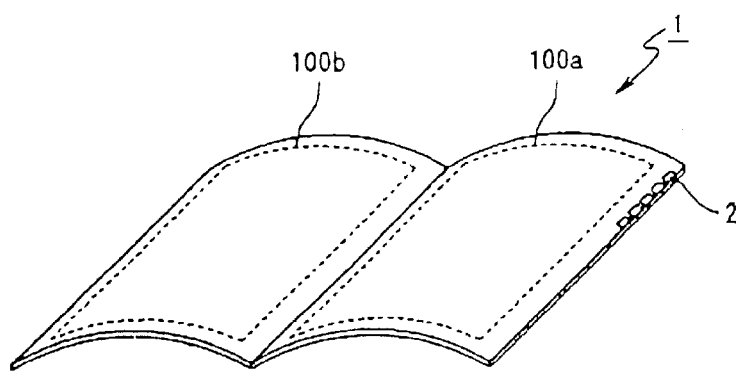

FIG. 9 shows an exemplary use of the electronic sheet manufactured by the above procedure. As shown in FIG. 9(a), the electronic sheet 1 has a plurality of external terminals 2. These external terminals 2 are electrically connected to an external circuit, not shown, to provide required electricity or data concerning contents to be displayed in the display region 100. FIG. 9(a) shows the words, "ABCDEFG Corporation", and figures such as a quadrilateral and a circle in the display region 100. As shown in FIG. 9(b), the electronic sheet 1 may be bent. In the configuration shown in FIG. 9(b), the external terminals 2 are electrically connected to an external circuit, not shown, to provide required electricity or data concerning contents to be displayed in the display regions 100a and 100b.

Figure 10:
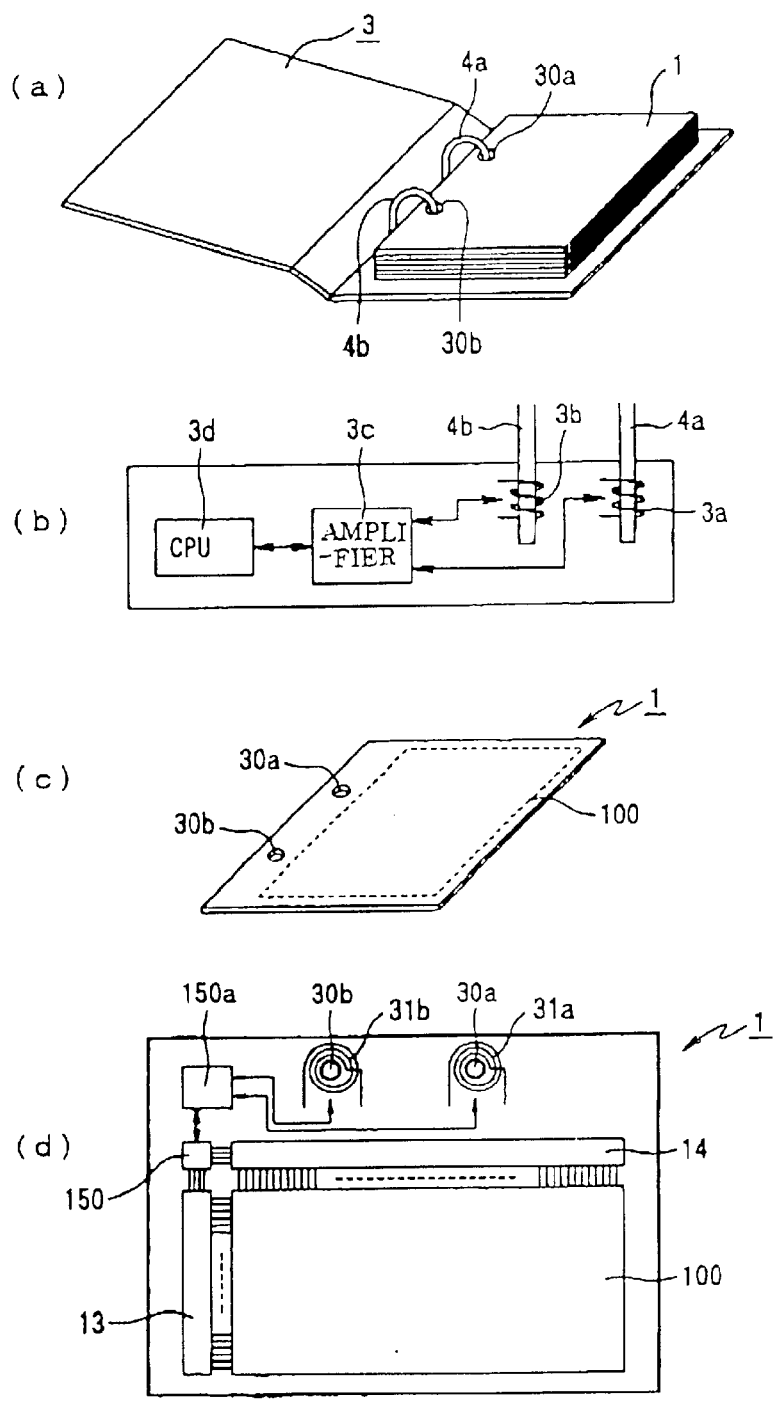
FIG. 10 includes illustrations showing an example of a binder-type electronic book.

Furthermore, the electronic sheet of the present invention may be applicable to an electronic book. That is, a binder-type electronic book is achieved by joining a plurality of the electronic sheets 1 in a binder functioning as a cover. FIG. 10(a) shows the binder-type electronic book. The figure illustrates a plurality of the electronic sheets 1 joined in a binder 3. In this case, each joined electronic sheet 1 is provided with through holes 30a and 30b, and rod magnets 4a and 4b included in the binder 3 extend through the through holes 30a and 30b, respectively. Both ends of each of the rod magnets 4a and 4b are fixed to the binder 3, and the rod magnets may be divided at each intermediate portion. When divided at the intermediate portion, the electronic sheet 1 is freely joined and separated to and from the binder 3. The rod magnets 4a and 4b freely open and close at each intermediate portion which may be divided, and a magnetic loop may be closed while the electronic sheet 1 is joined.

As shown in FIG. 10(b), the binder 3 includes controlling coils 3a and 3b corresponding to the rod magnets 4a and 4b, respectively, an amplifier 3c for supplying a current to the controlling coils 3a and 3b, and a CPU 3d for controlling the amplifier 3c.

As shown in FIG. 10(c), the electronic sheet 1 has the display region 100 and the through holes 30a and 30b which are both located at positions out of the display region 100 and corresponding to the rod magnets 4a and 4b as described above. FIG. 10(d) illustrates the detailed configuration of the electronic sheet 1. As shown in the figure, loop coils 31a and 31b are provided around the through holes 30a and 30b, which extend through the center of the loop coils. The loop coils 31a and 31b are connected to an amplifier 150a to supply a current generated in the loop coils 31a and 31b to the amplifier 150a. The amplifier 150a transmits data concerning contents to be displayed to an integrated circuit 150 for contactless data communication. The integrated circuit 150 controls and drives the scan driver region 13 and the data driver region 14, thereby causing the display region 100 to display desired data.

As described above, the electronic sheet 1 of this embodiment has contactless terminals composed of the loop coils 31a and 31b and the through holes 30a and 30b extending through the centers thereof, transmits and receives signals, and receives electricity through the contactless terminals. Two loop coils and two through holes are shown in the figure, and other combination may be acceptable.

The binder 3 is provided with the rod magnets 4a and 4b corresponding to the through holes 30a and 30b of the electronic sheet 1, respectively, and reading and carrying are possible while the rod magnets 4a and 4b extend through the through holes 30a and 30b. Since the rod magnets 4a and 4b are wound with the controlling coils 3a and 3b, electromagnetic induction between the loop coil of each joined electronic sheet and the controlling coil of the cover is used to supply electricity from the cover to the electronic sheet, and to perform transmitting and receiving signals therebetween by means of magnetism. Such a method of supplying electricity and transmitting and receiving signals without contact is described in Japanese Unexamined Patent Application Publication No. 11-039440. Only the desired electronic sheet in a plurality of joined electronic sheets may be chosen to be rewritten by causing transmitted or received signals to add a specific ID code (identification code).

In such a binder-type electronic book, printing, reading, and carrying are possible while joining and separating a plurality of electronic sheets. Since supplying electricity and transmitting and receiving signals are performed without contact, the electronic sheet and the cover of the electronic book may not have exposed terminals; hence, the binder-type electronic book having high reliability and excellent durability is provided.

The above electronic sheet according to the embodiment of the present invention may have the following configurations:

(1) an electronic sheet including a driver region for controlling the operation of an organic transistor, wherein the driver region includes a scan driver region for transmitting a scan signal for choosing the pixels and a data driver region for transmitting a data signal corresponding to data to be displayed with the pixels;

(2) the above electronic sheet including the driver region for controlling the operation of the organic transistor, further including electrical contact terminals for receiving external signals transmitted to the driver region, wherein the external signals are applied through the terminals; and (3) the above electronic sheet including an electrophoretic device provided on a flexible substrate, further including a ferroelectric layer for maintaining electric polarization.

As described above, the present invention has an advantage that the electronic sheet which is capable of being printed out of the office and is easy to carry is provided by forming a display region, using an electrophoretic dispersion, on a flexible substrate. Using the electrophoretic dispersion encapsulated in a capsule provides an advantage that application of the dispersion is easy. A driver region-forming procedure in which a thin film is formed on a substrate, is stripped, and then pasted onto another flexible substrate provides an advantage that the driver region is easily disposed around the display region. The entire disclosure of Japanese Patent Application 2000-367165 filed Dec. 1, 2000, is hereby incorporated by reference

What is claimed is:

1. An electronic sheet comprising an electrophoretic device, the electrophoretic device comprising:
   an organic transistor;
   an electrophoretic dispersion liquid that includes electrophoretic particles dispersed in a liquid phase dispersion medium, wherein:
      an electrode that provides voltage to the electrophoretic dispersion liquid; and
      a capacitive element formed over the electrode and connected to the electrophoretic dispersion liquid, wherein the capacitive element stores a charge while the organic transistor is in an on state wherein:
         a polarization of the electrophoretic dispersion liquid is retained by the charge stored in the capacitive element;
         the capacitive element is a resin layer; and the electrophoretic device is formed on a flexible substrate.

2. The electronic sheet according to claim 1, further comprising a driver region for controlling the operation of the organic transistors.

3. The electronic sheet according to claim 1, the electrophoretic dispersion layer being formed by arranging a plurality of capsules filled with the electrophoretic dispersion liquid.

4. The electronic sheet according to claim 2, the driver region being formed by steps comprising:
   forming a thin-film on a substrate; and
   disposing the thin-film onto a surface of another flexible substrate.

5. The electronic sheet according to claim 2, further comprising a contactless terminal for inputting external signals transmitted to the driver region, the external signals being applied through the contactless terminal.

6. The electronic sheet according to claim 5, the contactless terminal including a loop coil and a through hole extending through the center of the loop coil, and the external signals being input by magnetism applied over the through hole.

7. An electronic book comprising a rod magnet extending through the through hole provided in the electronic sheet according to claim 6, and a controlling coil wound around the rod magnet,
   the external signals being input to the electronic sheet by applying magnetism generated by the controlling coil to the through hole.

8. The electronic book according to claim 7, the rod magnet opening and closing at a dividable intermediate portion thereof, and the magnetic loop being closed when the rod magnet is closed to join the electronic sheet in a state where the rod magnet extends through the through hole.

9. The electronic book according to claim 7, transmitting and receiving the external signals being performed between the controlling coil and the loop coil by magnetism.

10. A method for manufacturing an electronic sheet according to claim 1, comprising:
   forming a transistor array including the organic transistor on the flexible substrate;
   forming a partition in the shape of a frame outside the resulting transistor array; and
   forming an electrophoretic dispersion layer inside the frame.

11. The method for manufacturing an electronic sheet according to claim 10, the electrophoretic dispersion layer being formed by arranging a plurality of capsules filled with the electrophoretic dispersion liquid.

12. The method for manufacturing an electronic sheet according to claim 10, further comprising:
   forming the driver region as a thin-film on another substrate;
   disposing the driver region onto a region other than the organic transistor region;
   electrically connecting the organic transistor region and the driver region; and
   forming a partition in the shape of a frame.

13. The method for manufacturing an electronic sheet according to claim 1, comprising the step of forming the organic transistor by at least an ink jet process.

14. The electrophoretic sheet according to claim 1 wherein the polarization of the electrophoretic dispersion liquid is retained by the charge stored in the capacitive element when the organic transistor is in an off state.

15. An electrophoretic device comprising:

an organic transistor;

an electrophoretic dispersion liquid that includes electrophoretic particles dispersed in a liquid phase dispersion medium;

an electrode that provides voltage to the electrophoretic dispersion liquid; and a capacitive element formed over the electrode and connected to the electrophoretic dispersion liquid, wherein the capacitive element stores a charge while the organic transistor is in an on state; wherein:

a polarization of the electrophoretic dispersion liquid is retained by the charge stored in the capacitive element; and the capacitive element is a resin layer.

16. The electrophoretic device according to claim 15 wherein the polarization of the electrophoretic dispersion liquid is retained by the charge stored in the capacitive element when the organic transistor is in an off state.

* * * * *

UNITED STATES PATENT AND TRADEMARK OFFICE
CERTIFICATE OF CORRECTION

PATENT NO. : 6,774,884 B2
DATED : August 10, 2004
INVENTOR(S) : Tatsuya Shimoda et al.

It is certified that error appears in the above-identified patent and that said Letters Patent is hereby corrected as shown below:

<u>Title page,</u>
Item [75], Inventors, should read
-- Tatsuya Shimoda, Fujimi-cho (JP)
   Hideyuki Kawai, Fujimi-cho (JP)
   Satoshi Inoue, Chino (JP) --

<u>Column 6,</u>
Line 55, "$\mu$M" should read -- $\mu$m --

Signed and Sealed this

Twenty-sixth Day of July, 2005

JON W. DUDAS
*Director of the United States Patent and Trademark Office*